United States Patent [19]

Hibino

[11] Patent Number: 4,552,819

[45] Date of Patent: Nov. 12, 1985

[54] ADHESIVE AND HEAT RECOVERABLE ARTICLE HAVING A LAYER OF THE ADHESIVE

[75] Inventor: Yutaka Hibino, Osaka, Japan

[73] Assignee: Sumitomo Electric Industries, Ltd., Osaka, Japan

[21] Appl. No.: 541,181

[22] Filed: Oct. 12, 1983

[30] Foreign Application Priority Data

Oct. 12, 1982 [JP] Japan .............................. 57-179633
Oct. 14, 1982 [JP] Japan .............................. 57-180593

[51] Int. Cl.[4] ...................... B32B 27/08; C08F 216/06
[52] U.S. Cl. ..................................... 428/516; 525/56; 525/57; 525/92
[58] Field of Search .............................. 525/92, 56, 57; 428/516

[56] References Cited

U.S. PATENT DOCUMENTS

| | | | |
|---|---|---|---|
| 4,169,822 | 10/1979 | Kutch | 525/92 |
| 4,247,502 | 1/1981 | Loechell | 264/130 |
| 4,427,825 | 1/1984 | Degrassi et al. | 525/56 |
| 4,455,204 | 6/1984 | Pieslak et al. | 428/523 |

FOREIGN PATENT DOCUMENTS 55-104373  8/1980  Japan ..................................... 525/92

*Primary Examiner*—John C. Bleutge
*Assistant Examiner*—A. L. Carrillo
*Attorney, Agent, or Firm*—Sughrue, Mion, Zinn, Macpeak & Seas

[57] ABSTRACT

This invention provides an adhesive suitable to use as a hot-melt adhesive, and a heat-recoverable article having a layer of this adhesive, said adhesive adhering to a variety of metals and plastics and being superior in low-temperature brittleness and high-temperature adhesion.

The adhesive comprises 50 to 90 wt % of ethylene-vinyl acetate copolymer having a hydrolysis ratio of 50 to 90 wt %, 5 to 30 wt % of polyamide resin having an amine value of 0.5 to 15, and 5 to 30 wt % of styrene-butadiene-styrene block copolymer of styrene-isoprene-styrene block copolymer containing less than 30 wt % of styrene, mixed together.

The heat-recoverable article having a layer of the adhesive is prepared by applying said adhesive to at least one part of the surface of a heat-recoverable article made from a rubber, a plastics or a mixture thereof.

18 Claims, 2 Drawing Figures

ADHESIVE AND HEAT RECOVERABLE ARTICLE HAVING A LAYER OF THE ADHESIVE

FIELD OF THE INVENTION

The present invention relates to an adhesive suitable to use as a hot-melt adhesive, and a heat-recoverable article having a layer of the adhesive which are improved in adhesion to a variety of metals and plastics.

BACKGROUND OF THE INVENTION

It is known that a hot-melt adhesive is used for bonding metal and plastics together. It is also known that a hot-melt adhesive is applied to a heat-recoverable article, for example, heat-recoverable sleeve or terminal cap for covering the splices and terminals of power cables, communications cables, copper pipes, and steel pipes.

The hot-melt adhesive now in use for heat-recoverable articles adheres to not all kinds of metals and synthetic resins used for purposes such as splices and terminals, such as iron, copper, lead, aluminum, stainless steel, steel, polyethylene, polypropylene, polyvinyl chloride, polyester, chloroprene, and ethylenepropylene rubber. Some hot-melt adhesives adhere to polyethylene and metals, but do not adhere to polyvinyl chloride and polyester. Some other hot-melt adhesives adhere to polyvinyl chloride and polyester, but do not adhere to polyethylene and polypropylene.

It is known that the bonding of a polyolefin resin such as polyethylene, polypropylene, and ethylenepropylene rubber and a metal such as copper, iron, and aluminum can be achieved with ethylene-vinyl acetate copolymer, ethylene-ethyl acrylate copolymer, ethylene-glycidyl methacrylate copolymer, ethylene-glycidyl methacrylate-vinyl acetate terpolymer, ionomer resin, or ethylene-acrylic acid-acrylate ester terpolymer obtained by hydrolyzing or thermally decomposing ethylene-acrylate ester copolymer. However, these polymers are not satisfactory in adhesion to lead-coated cables or polyvinylchloride sheath cables. Moreover, ethylenic adhesives are superior in low-temperature impact resistance but are poor in shear bond strength and peel strength at high temperatures. They often cause such troubles as displacing of the bonded part and leaking of a gas during use.

On the other hand, it is known that polyamide resins and saturated polyester resins are used for bonding polyvinyl chloride or polyester resin to a metal such as copper, lead, and aluminum. However, they do not adhere to polyethylene sheath cables. In addition, they are poor in low-temperature impact resistance, and the bonded parts often break or peel when the cable is bent or subjected to impact at low temperatures.

The splices and terminals of power cables and communications cables are made up of a variety of materials, and therefore it is inconvenient that the adherends are limited as mentioned above.

Recently, wires and cables and copper and steel pipes have come to be used over a broad temperature range from an extremely low temperature such as about $-50°$ C. to an extremely high temperature such as about 90° C. As a result, there has arisen a demand for heat-recoverable articles coated with an adhesive which resists such a severe temperature condition. However, heretofore, a satisfied adhesive has not been obtained.

In order to solve this problem, there was proposed in Japanese Laid-Open Patent No. 123823/1981 a heat-recoverable article having an adhesive layer composed of a polyethylene adhesive and a polyamide adhesive. This heat-recoverable article adheres to a variety of adherends, but is not satisfactory in both performances at a low temperature and a high temperature.

SUMMARY OF THE INVENTION

It is an object of this invention to provide an adhesive which is able to adhere to a variety of metals, rubbers and plastics and which is superior in high-temperature performances and not brittle at a low temperature.

Another object of the present invention is to provide a heat-recoverable article having a layer of this adhesive.

The adhesive is obtained by blending a specific ethylene copolymer, a specific polyamide resin, and a specific rubber in a specific ratio. The adhesive comprises 50 to 90 wt% of ethylene-vinyl acetate copolymer having a hydrolysis ratio of 50 to 90 wt%, 5 to 30 wt% of polyamide resin having an amine value of 0.5 to 15, and 5 to 30 wt% of styrene-butadiene-styrene block copolymer or styrene-isoprene-styrene block copolymer containing less than 30 wt% of styrene, mixed together.

The heat-recoverable article having a layer of the adhesive is prepared by applying the adhesive of the present invention to at least one part of the surface of a heat-recoverable rubber or plastics product.

DETAILED DESCRIPTION OF THE INVENTION

Figure 1:
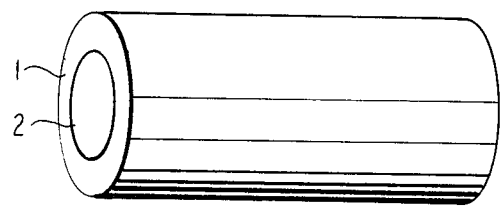
FIG. 1 is a perspective view of an embodiment of a tubular heat-recoverable article.

The adhesive of this invention is composed of three components of ethylene-vinyl acetate copolymer, polyamide resin, and styrene-butadiene-styrene or styrene-isoprene-styrene block copolymer. Each of these components is described in the following.

The hydrolyzed ethylene-vinyl acetate copolymer used in this invention is a partial hydrolyzate of ethylene-vinyl acetate copolymer which differs in the content of vinyl acetate, the ratio of hydrolysis and the melt index (hereinafter referred to M.I.; measured according on the method of Japanese Industrial Standard K 6760). The content of vinyl acetate is preferably less than 45 wt% and more preferably is less than 35 wt%. The ratio of hydrolysis should be 50 to 90 wt%, and preferably 60 to 90 wt%. If the content of vinyl acetate is greater than 45 wt%, the resulting adhesive is poor in adhesion to polyolefin and is also poor in thermal stability and low-temperature resistance. If the ratio of hydrolysis is less than 50 wt%, the resulting adhesive tends to have a low melting point and poor mechanical strength at high temperatures. If the ratio of hydrolysis is greater than 90 wt%, the resulting adhesive has poor impact resistance at low temperature and a high melt viscosity which is preferably not more than $10^4$ poise. The M.I. is preferably 10–400, and more preferably 100–300. When the M.I. is greater than 400, fluidity of the adhesive tends to be too large, and when the M.I. is smaller than 10 the melt viscosity tends to be too large. Preferably, after hydrolysis, the ethylene-vinyl acetate copolymer is grafted with 0.1 to 5.0 wt% of at least one organic carboxylic acid to improve the adhesion to metals. The carboxylic acids include saturated and unsaturated aliphatic and aromatic carboxylic acids. Furthermore, the carboxylic acids include mono- and di-carboxylic acids. Examples of the acids include acrylic acid, phthalic acid, adipic acid, sebacic acid, maleic acid and fumaric acid. When the acid is used in an amount of more than 5 wt% the adhesive tends to be poor in adhesion.

Examples of ethylene-vinyl acetate copolymer having a ratio of hydrolysis of 50 to 90 wt% include Dumilan D-291, D-229, D-159, D-251, G-222, G-252, G-422, C-2191, C-2271, C-1591, C-1570, C-1580, C-1550, and C-2280 made by Takeda Chemical Industries, Ltd.

The polyamide resin having an amine value of 0.5 to 15 is a polymer produced by reacting a dimer acid (which is an unsaturated dibasic acid) and a diamine. Examples of the dimer acid include tall oil fatty acid and soybean oil fatty acid. Diamine which can be used includes aliphatic, cycloaliphatic and aromatic amines, preferably, having 2–15 carbon atoms. Examples of diamine include ethylenediamine, hexamethylenediamine, isophoronediamine, xylenediamine, 4,4-diaminodicyclohexylmethane, p,p'-methylenediamine, trimethylhexamethylenediamine. (The amine value of a polyamide is the number of mg of potassium hydroxide which is an equivalent to amine groups contained in 1 g of the polyamide.)

The polyamide used in the present invention may contain at least one aliphatic dicarboxylic acid in order to control fluidity of the adhesive. It is preferable to use an aliphatic dicarboxylic acid having at least 4 carbon atoms, such as adipic acid, azelaic acid and sebacic acid. The acid is used in such an amount that the softening point of the adhesive is desirable. The acid is used with a dimer acid upon polymerization of the polyamide.

The polyamide resin preferably has a number-average molecular weight of 1,500 to 20,000, more preferably 7,000 to 15,000, and preferably has a ring-and-ball test softening point of about 80° C. to 180° C., more preferably 120° to 150° C. According to this invention, the polyamide should have an amine value from 0.5 to 15, preferably 2 to 12. If the amine value is lower than 0.5, the resulting adhesive tends to become poor in adhesion to metals; and if the amine value is higher than 15, the resulting adhesive tends to be susceptible to thermal degradation and poor in miscibility with the ethylene-vinyl acetate copolymer and consequently poor in adhesion.

The polyamide resin having an amine value of 0.5 to 15 is exemplified by Versalon 1128, 1300, 1138, 1139, 1140, 1165, and 1175 available from Henckel Japan Co., Ltd. and Tomide 394, 509, 1310, 535, 1350, 512, 565, 500, 575, and 1360 available from Fuji Kasei Kogyo Co., Ltd.

The styrene-butadiene-styrene block copolymer or styrene-isoprene-styrene block copolymer preferably having a number average molecular weight of 100,000 to 500,000, and more preferably 120,000 to 350,000 and containing not more than 30 wt% of styrene is exemplified by Califlex TR-1101, TR-1102, TR-1184, TR-1107, and TR-1112 available from Shell Kagaku Co., Ltd. and Tufprene A, Solprene T-411, Asaprene T-431, and Solprene T-475 available from Asahi Chemical Industry Co., Ltd. If the styrene content become higher than 30 wt%, the block copolymer tends to be brittle and lose rubbery resilience at low temperatures, therefore, such copolymers do not act as agents for improving low temperature performances. The block copolymer containing not more than 30 wt% of styrene is dispersed in the form of fine rubber particles in the mixture of ethylene-vinyl acetate copolymer and polyamide resin. This dispersion forms a sea island structure which improves the low-temperature brittleness, low-temperature impact resistance, and low-temperature adhesion. Such characteristics can not be seen when a rubber such as natural rubber, butyl rubber, chloroprene rubber or butadiene rubber is used.

The content of ethylene-vinyl acetate copolymer in the adhesive of this invention should be 50 to 90 wt%. If it becomes less than 50 wt%, the resulting adhesive tends to be poor in adhesion to polyolefin resins, and if it becomes higher than 90 wt%, the resulting adhesive tends to be poor in adhesion to polyvinyl chloride resin and metals. The content of polyamide resin should be 5 to 30 wt%. If it becomes less than 5 wt%, the resulting adhesive tends to be poor in adhesion to polyvinyl chloride resin and metals and also poor in water resistance. If it becomes higher than 30 wt%, the resulting adhesive tends to be poor in adhesion to polyolefin resins and in performances at a low-temperature. The content of the block copolymer should be 5 to 30 wt%. If it becomes less than 5 wt%, the resulting adhesive tends to be brittle at a low-temperature and tends to be poor in low-temperature impact resistance; and if it becomes higher than 30 wt%, the resulting adhesive tends to be poor in adhesion to metals.

The above-mentioned three components are essential; but it is permissible to add a small amount of tackifier such as terpene resin, terpene phenol resin, and an alkyl phenol resin. It is usually added in an amount of 0.5 to 30 parts by weight per 100 parts by weight of the three components composition. It is also permissible to add colorants, fillers, and antioxidants, preferably in the amount of 0.5 to 30 parts by weight per 100 parts by weight of the three components composition.

The adhesive of the present invention can adhere to metals such as iron, copper, lead, aluminum, and stainless steel, and plastics such as polyolefines, e.g., polyethylene and polypropylene, polyvinylchloride, polyester, an epoxy resin and a nylon resin, rubber such as butyl rubber, chloroprene rubber, styrene-butadiene rubber, and nitrile rubber.

The adhesive of the present invention may be used as it is, that is, as a hot-melt adhesive, and may be used as a solution of a proper organic solvent.

Figure 2:
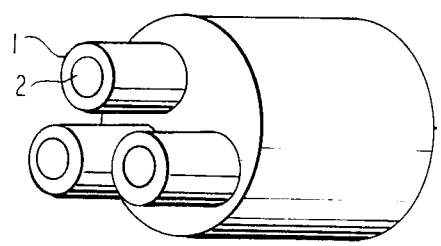
FIG. 2 is a perspective view of an embodiment of a three-forked heat-recoverable article.

The adhesive of the present invention may be applied to at least a part of the surface of a heat-recoverable article made from rubber or plastics. The adhesive is applied to for example, the inside of a tube made of crosslinked thermoplastic resin or rubber as shown in FIG. 1 and FIG. 2. In FIGS. 1 and 2, 1 shows crosslinked polyethylene and 2 shows a hot-melt adhesive of the present invention. Thus there is obtained the heat-recoverable article of this invention.

The heat-recoverable rubber or plastics article can be of any shape such as a sheet, tape, tube, or cap according to the intended use.

The heat-recoverable article can be made of a crosslinked polyolefin such as polyethylene, rubber such as butyl rubber, chloroprene rubber, styrene-butylene rubber, nitrile rubber, silicone rubber and ethylenepropylene rubber and a mixture of at least one rubber and at least one polyolefin. The rubber or plastics article of desired shape is rendered heat-recoverable by crosslinking (chemically or with irradiation) and physically deforming at a temperature higher than a softening point and cooling to room temperature while maintaining the deformed shape. The heat-recoverable article thus prepared is recovered to its original shape when heated.

The adhesive layer may be formed anywhere on the heat-recoverable article according to the shape and intended use. In the case where the heat-recoverable article is a tube for protective covering of wire and cable, the adhesive layer may be formed on the inside of the tube. In the case where the heat-recoverable article is a sheet for corrosion protection of steel pipes, the adhesive layer may be formed on one side of the sheet which comes into contact with the steel pipe and, if necessary, on the overlapping part of the other side of the sheet.

The invention is now described in more detail with reference to the following examples.

EXAMPLE 1

Six kinds of hot-melt adhesives were prepared by mixing ethylene-vinyl acetate copolymer, polyamide resin, and styrene-butadiene-styrene block copolymer in the ratios of 90:5:5, 80:10:10, 70:15:15, 60:20:20, 50:30:20, and 50:20:30 by weight. Mixing was accomplished at 150° C. for 30 minutes by using a kneader. The three components used were as follows:

Ethylene-vinyl acetate copolymer (abbreviated as EVA hereinafter): "Dumilane D-215" (having vinyl acetate content of 30 wt%, M.I. of 400 and hydrolysis ratio of about 80%).

Polyamide resin (abbreviated as PAm hereinafter): "Versalon 1140" (having an amine value of 8, a softening point of about 140° C., and a molecular weight of about 15,000)

Styrene-butadiene-styrene block copolymer (abbreviated as SBS hereinafter): "Cariflex TR-1101" (containing 30 wt% of styrene and molecular weight of about 300,000).

The resulting hot-melt adhesive was pressed at 150° C. into a 2.0 mm thick sheet and a 0.5 mm thick sheet for testing the performance.

The hot-melt adhesive was applied, in a thickness of 0.5 mm, to a heat-recoverable sleeve measuring 100 mm in diameter which was produced by expanding a crosslinked polyethylene pipe measuring 50 mm in inside diameter and 3.0 mm in thickness under heating. This heat-recoverable article with an adhesive layer was used for performance test 4.

PERFORMANCE TEST 1

Brittleness temperature test: The 2-mm thick adhesive sheet was subjected to the low-temperature brittleness test according to ASTM D-746.

PERFORMANCE TEST 2

The 2-mm thick adhesive sheet was subjected to the ring-and-ball softening point test according to ASTM E-28.

PERFORMANCE TEST 3

The 0.5-mm thick adhesive sheet was used for bonding a 2.0-mm thick crosslinked polyethylene sheet (PE) or polyvinyl chloride sheet (PVC) to a steel plate (Fe), copper plate (Cu), lead plate (Pb) or aluminum plate (Al), and for bonding a polyvinyl chloride sheet (PVC) to a copper plate (Cu) or aluminum plate (Al), by pressing at 150° C. for 10 minutes. After cooling, the bonded sample was subjected to a peel test (at an angle of 180°) according to ASTM D-903. In the case of the bonded sample of PE and Fe, this peel test was carried out also at −50° C. and +90° C.

PERFORMANCE TEST 4

The heat-recoverable tube made of crosslinked polyethylene (PE) with the adhesive applied to the inside thereof in a thickness of 0.5 mm was coated on a steel pipe (Fe), copper pipe (Cu), aluminum pipe (Al), lead pipe (Pb), and polyvinyl chloride pipe (PVC), each having 70 mm in diameter, and then heated with a gas burner to effect shrinkage. After cooling, the crosslinked polyethylene was peeled at an angle of 90° to measure the bond strength. In the case of the steel pipe, the bond strength was also measured at −50° C. and +90° C.

The results of performance tests 1, 2 and 3 are shown in Table 1. The results of performance test 4 are shown in Table 2.

EXAMPLE 2

Six kinds of hot-melt adhesives were prepared by mixing ethylene-vinyl acetate copolymer, polyamide resin, and styrene-isoprene-styrene block copolymer in the ratios of 90:5:5, 80:10:10, 70:15:15, 60:20:20, 50:30:20, and 50:20:30 by weight. Mixing was accomplished at 150° C. for 30 minutes by using a kneader. The three components used were as follows:

EVA: "Dumilane D-2270" (having a vinyl acetate content of 30 wt%, a hydrolysis ratio of about 70% and M.I. of 80 and containing 0.5% of unsaturated carboxylic acid)

PAm: "Versalon 1165" (having an amine value of about 1.5 and a softening point of 160° C.) Styrene-isoprene-styrene block copolymer (abbreviated as SIS hereinafter): "Califlex TR-1107" (containing 14 wt% of styrene)

The resulting hot-melt adhesives were subjected to performance tests in the same manner as in Example 1.

The results of performance tests 1, 2 and 3 are shown in Table 3. The results of performance test 4 are shown in Table 4.

EXAMPLE 3

Six kinds of hot-melt adhesives were prepared by mixing ethylene-vinyl acetate copolymer, polyamide resin, and styrene-butadiene-styrene block copolymer in the ratios of 90:5:5, 80:10:10, 70:15:15, 60:20:20, 50:30:20, and 50:20:30 by weight. Mixing was accomplished at 150° C. for 30 minutes by using a kneader. The three components used were as follows:

EVA: "Dumilane C-1550" (having vinyl acetate content of 30 wt%, M.I.=30, a hydrolysis ratio of 55% and containing 0.5% of acrylic acid)

PAm: "Versalon 1358" (having an amine value of about 6 and a softening point of 140° C.)

SBS: "Solprene T-411" (containing 30 wt% of styrene and having a molecular weight of 300,000)

The resulting hot-melt adhesives were subjected to performance tests in the same manner as in Example 1.

The results of performance tests 1, 2 and 3 are shown in Table 5. The results of performance test 4 are shown in Table 6.

COMPARATIVE EXAMPLE 1

Three kinds of conventional hot-melt adhesives were prepared by mixing ethylene-vinyl acetate copolymer, polyamide resin, and styrene-butadiene rubber in the ratios of 80:10:10, 60:20:20 and 40:30:30 by weight. Mixing was accomplished at 150° C. for 30 minutes by using a kneader. The three components used were as follows:

EVA: "Evaflex No. 220" (having a vinyl acetate content of 30 wt%, M.I. of 150 and a hydrolysis ratio of 0%) made by Mitsui Polychemical Co., Ltd, PAm: "Daiamide T-450" (a block copolymer of nylon 12 and a polyether having a M.I. of 30 and a melting point of 110° C.) made by Daisel Co., Ltd.

Styrene-butadiene rubber: "Tafden 2000R" (containing 25 wt% of styrene) made by Asahi Chemical Industry Co., Ltd.

The resulting hot-melt adhesives were subjected to performance tests in the same manner as in Example 1.

The results of performance tests 1, 2 and 3 are shown in Table 7. The results of performance test 4 are shown in Table 8.

TABLE 1

| Mixing ratio | Brittle temperature (°C.) | Softening point (°C.) | Bond Strength (kg/cm) | | | | | | | |
|---|---|---|---|---|---|---|---|---|---|---|
| | | | PE/Fe −50° C. | PE/Fe 25° C. | PE/Fe 90° C. | PE/Cu 25° C. | PE/Al 25° C. | PE/Pb 25° C. | PVC/Cu 25° C. | PVC/Al 25° C. |
| 90:5:5 | −47 | 152 | 10.1 | 6.1 | 0.2 | 4.5 | 2.9 | 3.8 | 4.0 | 3.6 |
| 80:10:10 | −52 | 147 | 13.0 | 7.9 | 0.3 | 6.4 | 4.2 | 4.7 | 4.7 | 3.2 |
| 70:15:15 | −56 | 136 | 12.5 | 8.7 | 0.4 | 8.2 | 6.5 | 7.0 | 5.2 | 4.0 |
| 60:20:20 | −68 | 132 | 17.0 | 10.2 | 0.4 | 8.7 | 7.8 | 8.2 | 5.8 | 4.3 |
| 50:30:20 | −55 | 140 | 16.5 | 13.2 | 0.6 | 9.0 | 6.2 | 7.5 | 6.2 | 5.7 |
| 50:20:30 | −50 | 157 | 13.5 | 9.0 | 0.5 | 7.1 | 4.3 | 6.4 | 4.9 | 4.1 |

TABLE 2

| Mixing ratio | Bond Strength (kg/cm) | | | | | | |
|---|---|---|---|---|---|---|---|
| | Fe −50° C. | Fe 25° C. | Fe 90° C. | Cu 25° C. | Al 25° C. | Pb 25° C. | PVC 25° C. |
| 90:5:5 | 13.1 | 7.6 | 0.3 | 6.7 | 5.1 | 5.9 | 4.8 |
| 80:10:10 | 16.7 | 9.6 | 0.3 | 8.3 | 7.2 | 7.6 | 5.7 |
| 70:15:15 | 20.6 | 12.2 | 0.5 | 10.5 | 8.7 | 9.6 | 8.5 |
| 60:20:20 | 23.5 | 14.0 | 0.6 | 11.2 | 9.2 | 10.0 | 9.0 |
| 50:30:20 | 19.6 | 15.2 | 0.7 | 11.6 | 9.0 | 11.5 | 9.3 |
| 50:20:30 | 17.6 | 11.3 | 0.5 | 9.5 | 7.2 | 9.3 | 8.1 |

TABLE 3

| Mixing ratio | Brittle temperature (°C.) | Softening point (°C.) | Bond Strength (kg/cm) | | | | | | | |
|---|---|---|---|---|---|---|---|---|---|---|
| | | | PE/Fe −50° C. | PE/Fe 25° C. | PE/Fe 90° C. | PE/Cu 25° C. | PE/Al 25° C. | PE/Pb 25° C. | PVC/Cu 25° C. | PVC/Al 25° C. |
| 90:5:5 | −46 | 116 | 9.3 | 7.3 | 0.3 | 3.7 | 3.5 | 4.7 | 3.0 | 3.7 |
| 80:10:10 | −52 | 123 | 14.2 | 8.4 | 0.4 | 4.4 | 3.7 | 6.0 | 4.2 | 4.0 |
| 70:15:15 | −61 | 130 | 13.7 | 10.3 | 0.4 | 5.9 | 4.2 | 5.2 | 5.6 | 5.4 |
| 60:20:20 | −65 | 136 | 16.3 | 12.0 | 0.6 | 7.3 | 6.3 | 7.8 | 6.1 | 5.8 |
| 50:30:20 | −56 | 140 | 16.7 | 11.5 | 0.5 | 6.2 | 7.3 | 6.3 | 6.0 | 6.2 |
| 50:20:30 | −60 | 147 | 14.5 | 9.7 | 0.4 | 5.6 | 5.8 | 6.0 | 5.7 | 5.1 |

TABLE 4

| Mixing ratio | Bond Strength (kg/cm) | | | | | | |
|---|---|---|---|---|---|---|---|
| | Fe −50° C. | Fe 25° C. | Fe 90° C. | Cu 25° C. | Al 25° C. | Pb 25° C. | PVC 25° C. |
| 90:5:5 | 12.5 | 8.2 | 0.3 | 3.8 | 4.1 | 3.7 | 4.2 |
| 80:10:10 | 14.6 | 8.7 | 0.4 | 4.9 | 5.2 | 4.7 | 5.3 |
| 70:15:15 | 17.5 | 12.1 | 0.5 | 7.0 | 6.8 | 6.0 | 6.8 |
| 60:20:20 | 20.6 | 14.2 | 0.7 | 8.8 | 9.0 | 8.6 | 9.2 |
| 50:30:20 | 21.2 | 13.0 | 0.6 | 9.2 | 8.1 | 8.7 | 9.0 |
| 50:20:30 | 19.0 | 11.6 | 0.5 | 7.0 | 7.2 | 7.8 | 8.4 |

TABLE 5

| Mixing ratio | Brittle temperature (°C.) | Softening point (°C.) | Bond Strength (kg/cm) | | | | | | | |
|---|---|---|---|---|---|---|---|---|---|---|
| | | | PE/Fe −50° C. | PE/Fe 25° C. | PE/Fe 90° C. | PE/Cu 25° C. | PE/Al 25° C. | PE/Pb 25° C. | PVC/Cu 25° C. | PVC/Al 25° C. |
| 90:5:5 | −45 | 135 | 7.2 | 4.2 | 0.2 | 3.3 | 3.2 | 4.0 | 3.0 | 3.1 |
| 80:10:10 | −48 | 141 | 10.5 | 3.8 | 0.3 | 3.7 | 3.9 | 6.2 | 4.5 | 3.2 |
| 70:15:15 | −46 | 150 | 13.2 | 6.2 | 0.3 | 4.9 | 4.2 | 6.3 | 4.7 | 3.8 |
| 60:20:20 | −52 | 153 | 11.3 | 8.4 | 0.4 | 6.8 | 5.3 | 7.2 | 5.6 | 4.9 |
| 50:30:20 | −49 | 162 | 10.4 | 6.9 | 0.3 | 6.2 | 5.4 | 5.1 | 5.2 | 5.0 |
| 50:20:30 | −46 | 168 | 10.2 | 5.8 | 0.3 | 5.1 | 4.7 | 5.2 | 4.9 | 4.5 |

TABLE 6

| Mixing ratio | Bond Strength (kg/cm) | | | | | | |
|---|---|---|---|---|---|---|---|
| | Fe −50° C. | Fe 25° C. | Fe 90° C. | Cu 25° C. | Al 25° C. | Pb 25° C. | PVC 25° C. |
| 90:5:5 | 9.0 | 6.8 | 0.3 | 4.8 | 3.7 | 4.1 | 3.2 |
| 80:10:10 | 12.6 | 6.0 | 0.3 | 5.8 | 4.6 | 5.2 | 4.4 |
| 70:15:15 | 14.2 | 8.4 | 0.4 | 7.6 | 6.9 | 7.3 | 6.8 |
| 60:20:20 | 11.9 | 7.1 | 0.5 | 8.0 | 7.0 | 8.4 | 7.0 |
| 50:30:20 | 11.5 | 6.9 | 0.5 | 6.8 | 6.2 | 7.2 | 6.1 |
| 50:20:30 | 10.6 | 5.3 | 0.4 | 5.9 | 5.1 | 6.0 | 5.2 |

TABLE 7

| Mixing ratio | Brittle temperature (°C.) | Softening point (°C.) | Bond Strength (kg/cm) | | | | | | | |
|---|---|---|---|---|---|---|---|---|---|---|
| | | | PE/Fe −50° C. | PE/Fe 25° C. | PE/Fe 90° C. | PE/Cu 25° C. | PE/Al 25° C. | PE/Pb 25° C. | PVC/Cu 25° C. | PVC/Al 25° C. |
| 80:10:10 | −45 | 150 | 3.5 | 1.5 | <0.1 | 1.6 | 0.7 | 0.7 | 0.4 | 0.3 |
| 60:20:20 | −26 | 165 | <0.1 | 2.1 | <0.1 | 2.5 | 1.8 | 1.7 | 0.6 | 0.4 |
| 40:30:30 | −15 | 188 | <0.1 | 2.6 | 0.2 | 3.1 | 1.9 | 2.1 | 0.5 | 0.2 |

TABLE 8

| Mixing ratio | Bond Strength (kg/cm) | | | | | | |
|---|---|---|---|---|---|---|---|
| | Fe −50° C. | Fe 25° C. | Fe 90° C. | Cu 25° C. | Al 25° C. | Pb 25° C. | PVC 25° C. |
| 80:10:10 | 4.8 | 3.2 | <0.1 | 1.9 | 0.9 | 1.2 | 0.4 |
| 60:20:20 | <0.1 | 3.4 | <0.1 | 3.1 | 1.9 | 1.8 | 0.5 |
| 40:30:30 | <0.1 | 2.7 | 0.3 | 2.8 | 2.3 | 2.0 | 0.2 |

As shown in Tables 1, 3, and 5, the hot-melt adhesives of this invention have a low brittleness temperature and have high bond strength over a broad temperature range. Especially good results were obtained with ethylene-vinyl acetate copolymer grafted with an unsaturated carboxylic acid.

As shown in Tables 2, 4, and 6, the heat-shrinkable article having a layer of the hot-melt adhesive of this invention bonds to a variety of substrates and is superior in low-temperature brittleness (has a high strength at a low temperature) and bond strength at high temperatures.

In contrast, the conventional hot-melt adhesives are poor in low-temperature brittleness and also poor in adhesion to various substrates due to the high softening point, as shown in Tables 7 and 8.

While the invention has been described in detail and with reference to specific embodiments thereof, it will be apparent to one skilled in the art that various changes and modifications can be made therein without departing from the spirit and scope thereof.

What is claimed is:

1. An adhesive, comprising:
   50 to 90 wt% of ethylene-vinyl acetate copolymer having a hydrolysis ratio of 50 to 90 wt%;
   5 to 30 wt% of polyamide resin having an amine value of 0.5 to 15, the polyamide resin being a reaction product of a dimer acid and a diamine; and
   5 to 30 wt% of a block copolymer selected from the group consisting of styrene-butadiene-styrene block copolymer and styrene-isoprene-styrene block copolymer, wherein the block copolymer contains less than 30 wt% of styrene.

2. An adhesive of claim 1, wherein the ethylene-vinyl acetate copolymer has a melt index of 10 to 400.

3. An adhesive of claim 1, wherein the ethylene-vinyl acetate copolymer is grafted with a carboxylic acid in an amount of 0.1 to 5.0 wt%.

4. An adhesive of claim 1, wherein the polyamide resin has a number average molecular weight of 1,500 to 20,000.

5. An adhesive of claim 1, wherein the polyamide resin has a softening point of 80° to 180° C.

6. An adhesive of claim 1, wherein the block copolymer has a number average molecular weight of 100,000 to 500,000.

7. An adhesive of claim 1, wherein the adhesive further contains at least one of a tackifier, a colorant, a filler and an antioxidant.

8. An adhesive of claim 1, wherein the adhesive further contains at least one of a tackifier, a colorant, a filler and an antioxidant in an amount of 0.5 to 30 parts by weight per 100 parts by weight of the total amount of the copolymer, polyamide and block copolymer.

9. An adhesive according to claim 1, wherein the polyamide has a ring-and-ball test softening point of 120° to 150° C.

10. A heat-recoverable article comprised of a material selected from the group consisting of rubbers and plastics, the article having positioned on at least a part of its surface a layer of an adhesive, the adhesive comprising:
    50 to 90 wt% of ethylene-vinyl acetate copolymer having a hydrolysis ratio of 50 to 90 wt%;
    5 to 30 wt% of polyamide resin having an amine value of 0.5 to 15, the polyamide resin being a reaction product of a dimer acid and a diamine; and
    5 to 30 wt% of a block copolymer selected from the group consisting of styrene-butadiene-styrene block copolymer and styrene-isoprene-styrene block copolymer, wherein the block copolymer contains less than 30 wt% of styrene.

11. A heat-recoverable article as in claim 10, wherein the ethylene-vinyl acetate copolymer has a melt index of 10 to 400.

12. A heat-recoverable article as recited in claim 10, wherein the ethylene-vinyl acetate copolymer is grafted with an unsaturated carboxylic acid in an amount of 0.1 to 5.0 wt%.

13. A heat-recoverable article as in claim 10, wherein the polyamide resin has a number average molecular weight of 1,500 to 20,000.

14. A heat-recoverable article of claim 10, wherein the polyamide resin has a softening point of 80° to 180° C.

15. A heat-recoverable article as in claim 10, wherein the block copolymer has a number average molecular weight of 100,000 to 500,000.

16. A heat-recoverable article as in claim 10, wherein the adhesive further contains at least one of a tackifier, a colorant, a filler and an antioxidant.

17. A heat-recoverable article as in claim 10, wherein the adhesive further contains at least one of a tackifier, a colorant, a filler and an antioxidant in an amount of 0.5 to 30 parts by weight per 100 parts by weight of the total amount of the copolymer, polyamide and block copolymer.

18. A heat-recoverable article of claim 10, wherein the heat-recoverable article is made of crosslinked polyolefin resin, rubber or a mixture thereof.

* * * * *